July 27, 1965    A. O. A. HODGE    3,197,215
MULTIPLE-STAGE SEALING ASSEMBLY
Filed Oct. 24, 1962

ARTHUR O. A. HODGE
INVENTOR.

BY *Lyon & Lyon*
ATTORNEYS

United States Patent Office 3,197,215
Patented July 27, 1965

3,197,215
MULTIPLE-STAGE SEALING ASSEMBLY
Arthur O. A. Hodge, 2526 Hermosa Ave.,
Hermosa Beach, Calif.
Filed Oct. 24, 1962, Ser. No. 232,812
15 Claims. (Cl. 277—64)

This invention relates to sealing devices of the type used to prevent leakage between relatively movable parts, such as, for example, a piston reciprocating within a cylinder, or a rotary or reciprocating shaft extending from a stationary housing.

It is the principal object of this invention to improve sealing assemblies of the prior art by providing a construction wherein each one of a series of sealing rings is caused to carry its proportionate share of the total unit pressure to which the sealing assembly is subjected. In prior-art sealing assemblies employing a series of packing rings, no adequate provision is made for limiting the proportion of the total pressure which may be placed across each packing ring. Accordingly, the service life of the sealing assembly may be very short if each packing ring in turn is subjected to the total pressure differential carried by the sealing assembly instead of carrying only its proportionate share of the total pressure differential. For any particular packing ring seal, there is a practical or economic limit of pressure which can be used for the particular type of fluid being sealed and the maximum relative surface speed between the moving parts. Accordingly, a great improvement in the service life of the sealing assembly is achieved by effectively limiting the magnitude of the pressure drop across each of the sealing rings in the assembly.

In accordance with this invention, each sealing ring in a series engages one of a series of axially spaced concentric supporting surfaces, each of a different diameter. A differential piston or load-distributing element is interposed between each pair of sealing rings and is mounted to move axially along two of the cylindrical supporting surfaces, so that the unit pressure applied to each sealing ring is less than that applied to its upstream neighbor.

Another object is to provide a sealing assembly of this type for use between parts which have relative rotary motion or relative longitudinal motion, or even where the parts have no relative motion at all. A more detailed object is to provide a sealing assembly of the type described which may be installed as a unitary assembly within a cartridge.

Other and more detailed objects and advantages will appear hereinafter.

Figure 1:
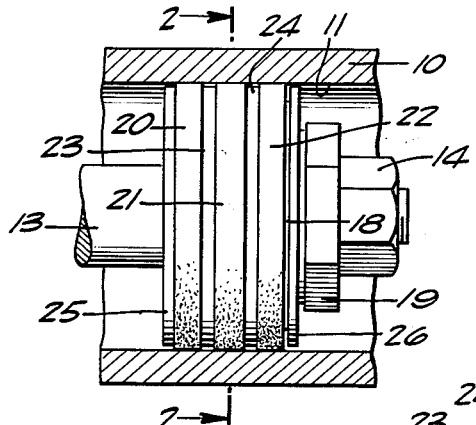
FIGURE 1 is a side elevation, partly in section, showing a preferred embodiment of this invention as applied to a piston and cylinder assembly.
Figure 2:
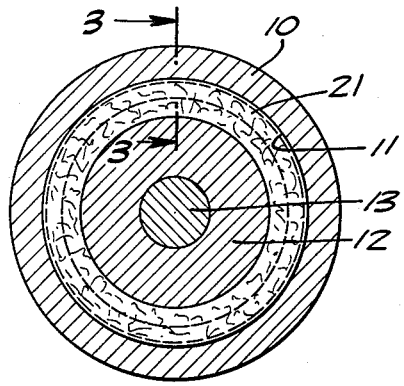
FIGURE 2 is a transverse sectional view taken substantially on the lines 2—2 as shown in FIGURE 1.

Referring to the drawings, the stationary cylinder generally designated 10 is provided with an internal cylindrical surface 11, and a piston 12 is fixed on a piston rod 13 by means of a clamping nut 14. A sealing assembly is provided on the piston 12 for preventing leakage between the piston and the cylindrical surface 11. In accordance with this invention, the piston 12 is provided with concentric cylindrical supporting surfaces 15, 16, and 17. The surfaces 15 and 17 are the same diameter, and the surface 16 has a smaller diameter. The surface 17 may be formed on a removable end flange part 18 for purposes of assembly, and a nut 19 holds the flange part 18 in position.

Sealing rings 20, 21, and 22, formed of resilient packing material, are mounted on the supporting surfaces 15, 16, and 17, respectively, and each of the sealing rings engages the cylindrical surface 11 on the cylinder 10. A load-distributing element or differential piston 23 is interposed between the sealing rings 20 and 21 and is axially movable along the cylindrical supporting surfaces 15 and 16. Similarly, a load-distributing element or differential piston 24 is interposed between the sealing rings 21 and 22 and is adapted for axial sliding movement along the surfaces 16 and 17. The diameters of the cylindrical supporting surfaces 15, 16, and 17, and therefore the inner diameters of the sealing rings 20, 21, and 22, are so chosen with respect to the diameter of the cylindrical surface 11 that the radial cross-section area of the sealing rings 20 and 22 is one-half that of the radial cross-section area of the sealing ring 21. End flanges 25 and 26 are provided on the piston 12 for engagement with the sealing rings 20 and 22, as described below.

Figure 3:
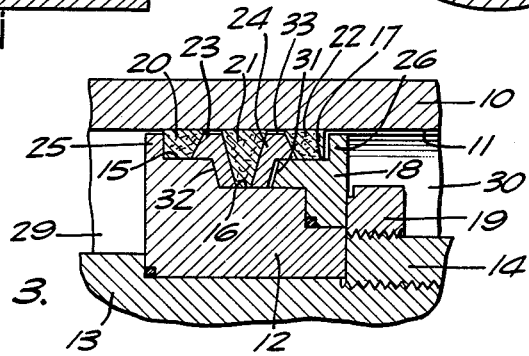
FIGURE 3 is a sectional detail taken substantially on the lines 3—3 as shown in FIGURE 2.

The piston 12 divides the interior of the cylinder 10 into chamber 29 and chamber 30. FIGURE 3 shows the position of the parts when the chamber 30 is pressurized and chamber 29 is not. The pressure in chamber 30 acts on the sealing ring 22 and causes it to move away from the flange 26. The full axial load on the sealing ring 22 is transmitted through the load-distributing element or differential piston 24 to the sealing ring 21. The load-distributing element 24 slides axially along the cylindrical supporting surfaces 17 and 16 and moves away from the face 31. The endwise force on the sealing ring 21 is taken by the load-distributing element or differential piston 23, which moves against the face 32.

Since the radial cross-section area of the sealing ring 21 is twice that of the sealing ring 22, the unit pressure exerted on the sealing ring 21 by the differential piston 24 is one-half of the unit pressure existing within the sealing ring 22. For example, if the unit pressure in the chamber 30 is 2000 p.s.i., and if the radial cross-section of the sealing ring 22 is one square inch, and if the radial cross-section of the sealing ring 21 is two square inches, the unit pressure within the sealing ring 22 will be 2000 p.s.i. and the unit pressure within the sealing ring 21 will be 1000 p.s.i. Moreover, fluid within the annular space 33 between the sealing rings 22 and 21 will exist at 1000 p.s.i., because it communicates with the side face of the sealing ring 21 which is contacted by the differential piston 24. Accordingly, the pressure drop across the sealing ring 22 is 1000 p.s.i. and the pressure drop across the sealing ring 21 is 1000 p.s.i. In the above example, it is assumed that no pressure exists in the chamber 29 and that the sealing ring 20 is not active when the chamber 30 is pressurized.

When pressure exists in the chamber 29, and is absent from the chamber 30, the sealing rings and differential pistons shift to the right, as viewed in FIGURE 3, so that the sealing ring 22 engages the flange 26 and so that the sealing ring 20 moves away from the flange 25 and the differential piston 23 moves away from the face 32. One-half of the total pressure drop then occurs across the sealing ring 20, and the other half occurs across the sealing ring 21, for the reasons set forth above.

When the piston 12 reciprocates within the cylinder 10, the chambers 29 are alternately pressurized, and, accordingly, the sealing rings and differential pistons move axially on the pistons at each end of the stroke. The central sealing ring 21 is effective in both directions of movement, while the end sealing rings 20 and 22 each seal in only one direction of movement.

Figure 4:
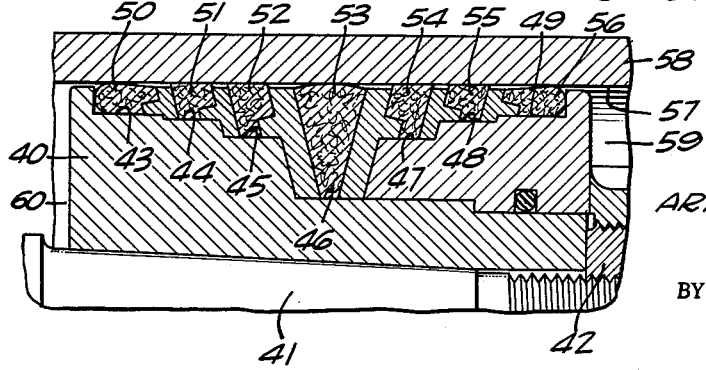
FIGURE 4 is a sectional detail similar to FIGURE 3 showing a modification.

The modified form of the invention shown in FIGURE 4 is similar to the form shown in FIGURE 3, except that a four-stage seal is provided instead of a two-stage seal. The piston 40 is fixed to the piston rod 41 by means of the nut 42. The piston is provided with concentric cylindrical supporting surfaces 43, 44, 45, and 46 of decreasing diameter. Similar supporting surfaces 47, 48, and 49 have the same diameters as surfaces 45, 44, and 43, respectively. Resilient sealing rings 50, 51, 52, 53, 54, 55, and 56 have the same outside diameter for contact with the cylindrical surface 57 of the cylinder 58, but the inside diameter of each sealing ring is the same as the supporting surface on which it is mounted. The diameters of the concentric supporting surfaces are chosen so that if the radial cross-section area of the central sealing ring 53 is "A," then the radial cross-section areas of the sealing rings 50 and 56 are each $A/4$, that of the sealing rings 51 and 55 are each $A/3$, and that of the sealing rings 52 and 54 are each $A/2$. A differential piston or load-distributing element is positioned between each pair of packing rings. Sealing rings 53, 54, 55, and 56 are active when the chamber 59 is pressurized, and sealing rings 50, 51, 52, and 53 are active when the chamber 60 is pressurized. If the unit pressure in one of the chambers is 4000# and if the other chamber is not pressurized, each of the active sealing rings has a pressure differential across it equal to 1000 p.s.i. In general, for equal distribution with "N" stages, the areas will be $$A, \frac{A}{2}, \frac{A}{3}, \frac{A}{4} \text{-----} \frac{A}{"N"}$$

Figure 5:
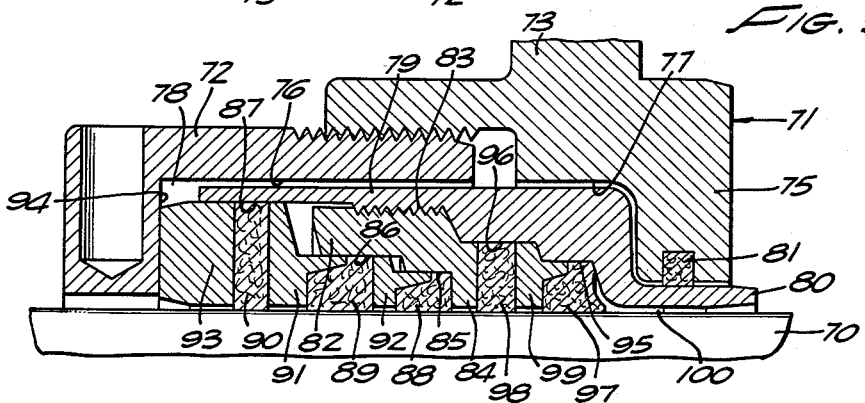
FIGURE 5 is a sectional detail similar to FIGURE 3, showing another modification.

In the modified form of the invention shown in FIGURE 5, a rotary or reciprocating shaft 70 extends through the interior of a housing 71, formed of separable parts 72 and 73. End flange 74 is provided on the housing part 72 and end flange 75 is provided on housing part 73. Walls 76 and 77 co-operate with the end flanges 74 and 75 to define an annular cavity 78 within the housing 71.

A sleeve cartridge 79 is mounted within the annular recess 78 and is provided with an annular extension 80 at one end which extends through the flange 75. A seal ring 81 prevents leakage between the opening in the flange 75 and the outer surface of the extension 80. The cartridge sleeve 79 has an internal part 82 removably connected by threads 83 for purposes of assembly. This internal part 82 has a flange 84 and a pair of concentric cylindrical supporting surfaces 85 and 86. The sleeve cartridge 79 has a third concentric cylindrical supporting surface 87. Resilient packing rings 88, 89, and 90 each contact the outer cylindrical surface of the shaft 70 and each engages one of the concentric supporting surfaces 85, 86, and 87, respectively. A differential piston or load-supporting element 91 is interposed between the sealing rings 89 and 90, and similarly a differential piston or load-distributing element 92 is interposed between the realing rings 88 and 90. The differential piston 91 has axial movement along the cylindrical supporting surfaces 86 and 87, and the differential piston 92 has axial movement along the cylindrical supporting surfaces 85 and 86. A thrust ring 93 is slidably mounted within the cylindrical surface 87 within the cartridge sleeve 79 and is interposed between the flange surface 94 and the sealing ring 90.

The sealing rings 88, 89, and 90 and their associated parts constitute one series of axially spaced sealing rings, and another series is provided by the concentric cylindrical supporting surfaces 95 and 96, the sealing rings 97 and 98 which engage those surfaces respectively, and the differential piston or load-distributing element 99 which is interposed between the sealing rings 97 and 98 and is axially movable along the surfaces 95 and 96. The advantage of using two separate series of sealing rings and differential pistons is that a large number of individual packing rings may be employed without requiring that the first packing ring in the series be of very small cross-sectional size. The first packing ring in the series is subjected to the highest unit pressure and, hence, its cross-sectional size should not be too small to obtain the required mechanical strength.

In operation, pressure is applied to the right-hand side of the parts shown in FIGURE 5, and this pressure acts on the exposed end of the extension 80 of the cartridge sleeve 79 and tends to move it toward the left within the cavity 76, sliding under the seal 81. Pressure also passes through the annular space 100 between the shaft 70 and the interior of the extension 80. This pressure acts on the packing rings 97 and 98 and differential piston 99 in the same manner as described above. Thus, the two packing rings 97 and 98 divide the total pressure drop of the first series equally between them, provided that the radial cross-section area of the sealing ring 97 is four-fifths that of the sealing ring 98. In the second series, the radial cross-section area of the packing ring 88 is one-third that of the packing ring 90, and the radial cross-section area of the packing ring 89 is one-half that of the sealing ring 90. With the cross-section areas stated, each of the packing rings 97, 98, 88, 89, and 90 takes its proportional share of the total pressure drop across the assembly; that is, the pressure drop across each of the five packing rings is the same and is equal to one-fifth of the total pressure drop across the assembly.

The area between shaft 80 and the rubbing surface of packing 81 and outer surface of shaft 70 determines the size of packing 90. In this case, it is one-fifth, or, if $(90) = A$, packing $89 = \frac{A}{2}$, packing $88 = \frac{A}{3}$, the area between 81 and $70 = \frac{A}{5}$ For example, at 5000 p.s.i., the load on the cartridge is $$5000 \times \frac{A}{5} = 1000A$$

This is counterbalanced by pressure at $$90 = \frac{1000A}{A} = 1000 \text{ p.s.i.}$$

For any pressure there is a size requirement for strength for the lip of cartridge 80; otherwise, it could approach zero and packing 90 could be too small for the necessary strength.

The cartridge sleeve 79 is capable of self-aligning movement, and it floats automatically to a position to distribute the pressure drop equally among the five packing rings.

In each of the forms of the invention described above, each differential piston element has two end surfaces defining generally radially extending lateral extremities each contacting a sealing ring.

Having fully described my invention, it is to be understood that I am not to be limited to the details herein set forth, but that my invention is of the full scope of the appended claims.

I claim:

1. In a sealing assembly of the type described, the combination of: first and second relatively movable members, one of said members having a cylindrical sealing surface, a pair of annular sealing rings mounted on the other of said members and each contacting said sealing surface, the latter said member having concentric cylindrical supporting surfaces, one of larger diameter than the other and each supporting surface supporting one of said sealing rings, respectively, an annular differential piston element interposed between said sealing rings and engaging a side face of each, said element being mounted for axial movement on said supporting surfaces, and means including flange means on the latter said member engageable with other side faces of said sealing rings.

2. In a sealing assembly of the type described, the combination of: inner and outer concentric members defining a space therebetween, one of said members having a cylindrical sealing surface, a pair of annular sealing rings mounted within said space on the other of said members and each having a sealing face, a supporting face and two side faces, the sealing faces contacting said sealing surface, the latter said member having concentric cylindrical supporting surfaces, one of larger diameter than the other and each contacting the supporting face of one of said sealing rings, respectively, an annular differential piston element interposed between said sealing rings and engaging a side face of each, said element being mounted for axial movement on said supporting surfaces, and means including flange means on the latter said member engageable with other side faces of said sealing rings.

3. In a sealing assembly of the type described, the combination of: a first member having a cylindrical bore, a second relatively movable member positioned within the bore, a pair of annular sealing rings mounted on said second member and each contacting said cylindrical bore, said second member having concentric cylindrical supporting surfaces, one of larger diameter than the other and each supporting surface supporting one of said sealing rings, respectively, an annular differential piston element interposed between said sealing rings and engaging a side face of each, said element being mounted for axial movement on said supporting surfaces, and means including flange means on said second member engageable with other side faces of said sealing rings.

4. In a sealing assembly of the type described, the combination of: first and second relatively movable members, one encircling a portion of the other, the inner of said members having a cylindrical external sealing surface, a pair of annular sealing rings mounted on the outer of said members and each contacting said sealing surface, said outer member having concentric cylindrical internal supporting surfaces, one of larger diameter than the other and each supporting surface supporting one of said sealing rings, respectively, an annular differential piston element interposed between said sealing rings and engaging a side face of each, said element being mounted for axial movement on said supporting surfaces, and means including flange means on said outer member engageable with other side faces of said sealing rings.

5. In a sealing assembly of the type described, the combination of: a cylinder member having a cylindrical bore, a piston member mounted to reciprocate within said bore, the piston member having a central cylindrical supporting surface and two series of axially spaced supporting surfaces extending therefrom and of increasing outside diameter, a plurality of sealing rings each having an inner face engaging one of said supporting surfaces and an outer face engaging said cylindrical bore, and a plurality of annular differential piston elements each interposed between two of said sealing rings and engaging a side face of each, said elements each being mounted for axial movement on two adjacent supporting surfaces, and a flange on each end of the piston engageable with a side face of a sealing ring at opposite ends of the series.

6. In a sealing assembly of the type described, the combination of: a cylinder member having a cylindrical bore, a piston member mounted to reciprocate within said bore, the piston member having three coaxial cylindrical supporting surfaces, two of said supporting surfaces being axially spaced and of the same diameter and a third supporting surface interposed therebetween and of smaller diameter, three sealing rings each having an inner face engaging one of said supporting surfaces and an outer face engaging said cylindrical bore, a pair of annular differential piston elements each interposed between two of said sealing rings and engaging a side face of each, said elements each being mounted for axial movement on two of said supporting surfaces, and a flange on each end of the piston at the ends of the first two said supporting surfaces.

7. In a sealing assembly of the type described, the combination of: a rotary member having an outer cylindrical surface, a stationary member encircling the rotary member, the stationary member having a series of coaxial internal cylindrical supporting surfaces of decreasing diameter, a series of resilient sealing rings each having an outer face engaging one of said supporting surfaces and an inner face engaging said cylindrical surface, a plurality of annular differential piston elements each interposed between two of said sealing rings and engaging a side face of each, said elements each being mounted for axial movement on two of said supporting surfaces, and an abutment on the stationary member at each end of the series of sealing rings.

8. In a sealing assembly of the type described, the combination of: a movable member having an outer cylindrical surface, a stationary member encircling the movable member, a stationary member having axially spaced flanges and a wall forming an annular cavity around said cylindrical surface, a cartridge sleeve within the cavity and having an annular extension projecting out of the cavity within one of said end flanges, seal means preventing leakage between the annular extension and said end flange, said cartridge sleeve having a series of coaxial internal cylindrical supporting surfaces of increasing diameter, a series of resilient sealing rings each having an outer face engaging one of said supporting surfaces and an inner face engaging said cylindrical surface, a plurality of annular differential piston elements each interposed between two of said sealing rings and engaging a side face of each, said elements each being mounted for axial movement on two of said supporting surfaces, an abutment within the sleeve engaging a sealing ring at one end of the series, and a spacer ring engaging the other flange and a sealing ring at the other end of the series.

9. In a cartridge sealing assembly of the type described, the combination of: a movable member having an outer cylindrical surface, a stationary member encircling the movable member, the stationary member having axially spaced flanges and a wall forming an annular cavity around said cylindrical surface, a cartridge sleeve within the cavity and having an annular extension projecting out of the cavity within one of said end flanges, seal means preventing leakage between the annular extension and said end flange, said cartridge sleeve having two separate series of coaxial internal cylindrical supporting surfaces of increasing diameter, a flange on the cartridge sleeve interposed between said two series of supporting surfaces, a plurality of resilient sealing rings each having an outer face engaging one of said supporting surfaces and an inner face engaging said cylindrical surface, a plurality of annular differential piston elements each interposed between two of said sealing rings and engaging a side face of each, said elements each being mounted for axial movement on two of said supporting surfaces, and an abutment on the stationary member at each end of the series of sealing rings.

10. A packing assembly for sealing the annular space between two relatively movable members, comprising: a pair of axially spaced annular resilient sealing rings each having a sealing surface and a cylindrical supporting surface, the sealing surfaces of the rings having the same diameter and the supporting surfaces thereof having different diameters, and an annular differential piston element interposed between said rings, said element having end surfaces defining generally radially extending lateral extremities contacting said rings, said element also having a pair of concentric cylindrical surfaces, each corresponding to the diameter of one of said supporting surfaces, respectively.

11. A packing assembly for sealing the annular space between two relatively movable members, comprising: a pair of axially spaced annular resilient sealing rings each having an outer sealing surface and an inner cylindrical supporting surface, the sealing surfaces of the rings having the same outer diameter and the supporting surfaces thereof having different inner diameters, and an annular differential piston element interposed between said rings, said element having end surfaces defining generally radially extending lateral extremities contacting said rings, said element also having a pair of concentric cylindrical surfaces each corresponding to the inner diameter of one of said supporting surfaces, respectively.

12. A packaging assembly for sealing the annular space between two relatively movable members, comprising: a pair of axially spaced annular resilient sealing rings each having an inner sealing surface and an outer cylindrical supporting surface, the sealing surface of the rings having the same inner diameter and the supporting surfaces thereof having different outer diameters, and an annular differential piston element interposed between said rings, said element having end surfaces defining generally radially extending lateral extremities contacting said rings, said element also having a pair of concentric cylindrical surfaces each corresponding to the outer diameter of one of said supporting surfaces, respectively.

13. A packing assembly for sealing the annular space between two relatively movable members, comprising: a series of axially spaced annular resilient sealing rings each having a sealing surface and a cylindrical supporting surface, the sealing surfaces of the rings having the same diameter and the supporting surfaces thereof having different diameters, and a plurality of annular differential piston elements each interposed between and contacting two adjacent rings in said series, said elements each having a pair of concentric cylindrical surfaces each corresponding to the diameter of one of the supporting surfaces of said adjacent rings, respectively.

14. A packing assembly for sealing the annular space between two relatively movable members, comprising: a series of axially spaced annular resilient sealing rings each having an outer sealing surface and an inner cylindrical supporting surface, the sealing surfaces of the rings having the same outer diameter and the supporting surfaces thereof having different inner diameters, and a plurality of annular differential piston elements each interposed between and contacting two adjacent rings in said series, said elements each having a pair of concentric cylindrical surfaces each corresponding to the inner diameter of one of the supporting surfaces of said adjacent rings, respectively.

15. A packing assembly for sealing the annular space between two relatively movable members, comprising: a series of axially spaced annular resilient sealing rings each having an inner sealing surface and an outer cylindrical supporting surface, the sealing surfaces of the rings having the same inner diameter and the supporting surfaces thereof having different outer diameters, and a plurality of annular differential piston elements each interposed between and contacting two adjacent rings in said series, said elements each having a pair of concentric cylindrical surfaces each corresponding to the outer diameter of one of the supporting surfaces of said adjacent rings, respectively.

References Cited by the Examiner

UNITED STATES PATENTS

| 346,378 | 7/86 | Loftus | 277—58 |
| 1,347,351 | 7/20 | Murray | 277—188 |
| 2,895,758 | 7/59 | Wright | 277—125 X |
| 3,004,783 | 10/61 | Webb | 277—103 |

LEWIS J. LENNY, *Primary Examiner.*

SAMUEL ROTHBERG, EDWARD V. BENHAM,
*Examiners.*